US012409905B2

(12) United States Patent
Hulme

(10) Patent No.: US 12,409,905 B2
(45) Date of Patent: Sep. 9, 2025

(54) MOUNTING DEVICE

(71) Applicant: Alexander George Hulme, London (GB)

(72) Inventor: Alexander George Hulme, London (GB)

( * ) Notice: Subject to any disclaimer, the term of this patent is extended or adjusted under 35 U.S.C. 154(b) by 180 days.

(21) Appl. No.: 18/318,285

(22) Filed: May 16, 2023

(65) Prior Publication Data

US 2024/0124085 A1    Apr. 18, 2024

(51) Int. Cl.
*B62J 7/06* (2006.01)

(52) U.S. Cl.
CPC ........................................ *B62J 7/06* (2013.01)

(58) Field of Classification Search
CPC ... B62J 7/06; B62J 11/00; B62J 50/225; B62J 45/00; B62J 9/21
See application file for complete search history.

(56) References Cited

U.S. PATENT DOCUMENTS

| 6,561,400 B2 * | 5/2003 | Lee | B62J 7/06 |
| | | | 224/420 |
| 8,267,418 B1 * | 9/2012 | Chuang | B62J 50/225 |
| | | | 280/288.4 |
| 8,627,990 B2 * | 1/2014 | Nakajima | B62J 11/00 |
| | | | 224/555 |
| 10,569,717 B2 * | 2/2020 | Peters | B62J 50/225 |
| 10,864,956 B2 * | 12/2020 | Whitten | F16M 11/105 |
| 11,760,432 B2 * | 9/2023 | Whitten | A45F 5/00 |
| | | | 224/420 |

FOREIGN PATENT DOCUMENTS

DE    202013007384 U1    9/2013

OTHER PUBLICATIONS

Chasiu75, RAM Mount Fork Stem Base Install with X-Grip, Apr. 21, 2017, https://www.youtube.com/watch?v=h4jbFzDg1U0 . (Year: 2017).*
Amazon.com: Motorcycle fork stem holes for phone support mount holder 13mm-20mm : Automotive, Feb. 27, 2021 (Feb. 27, 2021), pp. 1-9, XP093085821.
Tigra Sport: "MountCase BikeMount Stem Cap Installation Guide", Mar. 12, 2015 (Mar. 12, 2015), XP093085870.
The extended European search report Patent Application EP23173717.2, on Oct. 11, 2023, 08 Pages.

* cited by examiner

*Primary Examiner* — Corey N Skurdal

(57) ABSTRACT

An accessory mounting device 1 comprises a main body portion 2, a pair of mounting grips 3a, 3b configured to movably connect to the main body 2 from a first position substantially against the body 2, and a second position away from the main body 2, the grips 3a, 3b in the second position configured to grip and hold a secondary accessory in position on the mounting device 1, the main body portion 2 configured to connect to a vehicle fork steerer tube.

13 Claims, 8 Drawing Sheets

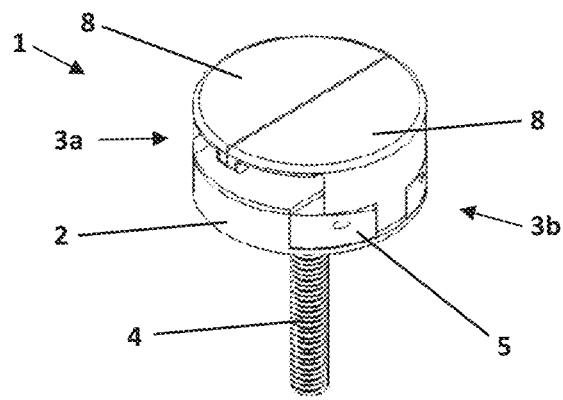
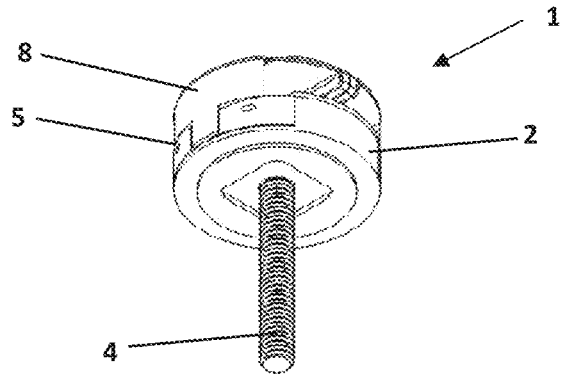
FIG. 4A
FIG. 4B
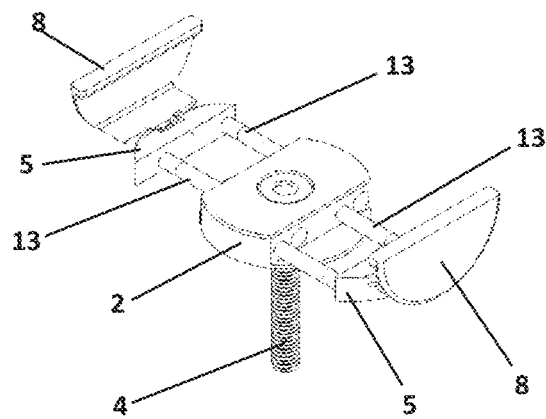
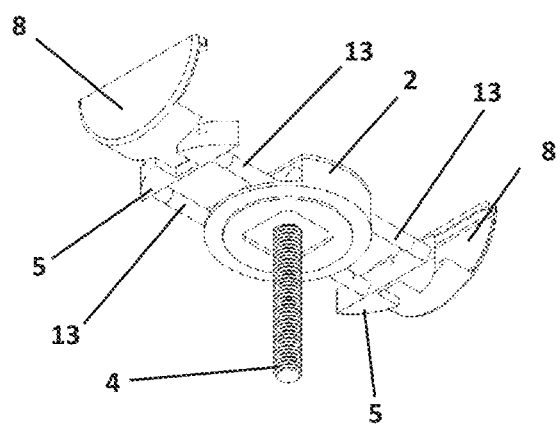
FIG. 5A
FIG. 5B

MOUNTING DEVICE

FIELD

The present invention relates to a mounting device for connecting an accessory to a bicycle, scooter, e-scooter, moped, motorcycle or similar vehicle. More particularly, the present invention relates to a mounting device that connects to a bicycle stem above the headset to allow secondary accessories to be mounted to the vehicle via the mounting device.

BACKGROUND

It is common for riders of bicycles to own and use a range of secondary items that do not come built into their vehicle. For example, very few makes of bicycle come with built-in lights as standard, and a rider will normally buy a set from a third-party supplier and detachably mount them on the bicycle as required, a normal mounting location for the front light being the bicycle handlebars.

Other items are frequently mounted in the same or a similar manner as required or desired by the user—for example they may mount GPS units, bicycle computers, or mobile devices such as mobile phones or pads or similar on the handlebars.

While it is common for items such as bicycle lights to contain their own mounting mechanisms such as integral straps or similar, other items such as GPS units, computers, cameras or mobile devices usually require a separate mounting device. This separate mounting device attaches to the frame or the handlebars, with the mobile device, GPS or other accessory then being connected to the mounting device.

An example of a known type of accessory mounting device is shown in FIG. 1. As shown, the mounting device is configured to connect around the cylindrical body of the handlebars, and to mount an accessory on the upper part of the mounting device, facing towards the rider.

The majority of bike stems on the market today are designed for a threadless headset, of the 'Ahead headset' type (also known as 'Aheadset or 'threadless headset'). These types of headsets bolt directly onto the fork steerer tube of the vehicle. An example of a type of accessory mounting device that can be used with this type of stem/headset is shown in FIGS. 2A-2C. This type of mounting device connects directly to the headset, via a bolt or similar that screws into the fork steerer tube, with the accessory mounting part extending from the top of the stem, so that an accessory can be mounted on top of the headset.

A similar device to that shown in FIGS. 2A-2C is shown in FIG. 2D, showing detail of the headset bolt that in use extends into the handlebar stem and connects to the fork steerer tube.

The devices shown in FIGS. 2A-2D are produced by 'SP Connect'.

As shown in FIGS. 2A-2C, an accessory is mounted onto the mounting device via a connection mechanism, one part of the connection mechanism forming part of the mounting device connected to the stem, and the other part connected to or integrally formed with the accessory. The two parts of the connection mechanism lock together in use to mount the accessory to the bicycle.

A common type of connection mechanism for this use is a 'quarter-turn' or 'bayonet' connector, where a user connects and disconnects the accessory by first bringing the accessory into contact with the mounting part, a part-turn out of alignment. Once the locking mechanisms are aligned in the correct position, the accessory is turned (e.g. through a quarter-turn) to engage the locking mechanisms and to bring the accessory into the required alignment for the user to use it. To disengage the locking mechanism and to remove the accessory from the mount, the process is reversed. A mounting mechanism of the type made by Garmin that uses a quarter turn connector is shown in FIG. 3.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY

It is an object of the present invention to provide a mounting device which goes some way to overcoming the abovementioned disadvantages or which at least provides the public or industry with a useful choice.

The term "comprising" as used in this specification and indicative independent claims means "consisting at least in part of". When interpreting each statement in this specification and indicative independent claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

Accordingly, in a first aspect the present invention may broadly be said to consist in a mounting device, comprising: a main body portion; a pair of mounting grips configured to movably connect to the main body from a first position substantially against the body, and a second position away from the main body, the grips in the second position configured to grip and hold a secondary accessory in position on the mounting device; the main body portion configured to connect to a vehicle fork steerer tube.

In an embodiment, the main body portion is substantially circular in plan view and substantially the same outer size and shape as the outer diameter of a fork steerer tube.

In an embodiment, each of the mounting grips comprises a carriage and a flap, the carriages and main body portion configured so that the flaps can rotate from the first position where the flaps are arranged to cover the top surface of the main body, substantially through 90 degrees to an open position where the flaps are rotated upright, the mounting grips further comprising a spring adapted to hold the flap in the first position and the open position.

In an embodiment, the mounting device further comprises a grip pad on the inner surface of each mounting grip, configured to provide a high-friction gripping surface.

In an embodiment, the main body comprises a plurality of substantially parallel passageways formed through the main body portion between the cut-out portions, and a plurality of extension slider shafts configured to locate into and slide within the passages in use, the outer ends of the extension slider shafts connecting to the mounting grips.

In an embodiment, the mounting device further comprises springs configured to connect between the extension slider shafts and the mounting grips to pull the mounting grips towards the main body, so that a compressive gripping force is exerted on any object located between the mounting grips.

In an embodiment, the springs and extension slider shafts are associated with the mounting grips and are configured so that the springs associated with a mounting grip compress from a neutral position when the associated mounting grip is moved away from the main body portion.

In an embodiment, the main body portion comprises substantially identical cut-out portions at each side, extending partway down each side of the main body portion, the carriage of the mounting grip fitting substantially within the cut-out portion.

In an embodiment, the cut-out portions are disk-segment shaped.

In an embodiment, the main body portion is configured to receive a headset bolt, so that the headset bolt can connect to the top of a vehicle fork steerer tube to hold the main body portion in position.

In an embodiment, the main body portion is configured to receive the headset bolt through an aperture extending through the main body portion.

In an embodiment, the main body portion comprises one part of a bayonet or quarter-turn type connector on the lower side thereof.

In an embodiment, the bayonet or quarter-turn type connector part is bolted to the remainder of the main body.

In an embodiment, the bayonet or quarter-turn type connector part is an integral part of the main body.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE FIGURES

Further aspects of the invention will become apparent from the following description which is given by way of example only and with reference to the accompanying drawings which show an embodiment of the device by way of example, and in which:

FIGS. 4A and 4B show perspective side views from the top and bottom respectively of a first embodiment of mounting device in a closed state.

FIGS. 5A and 5B show perspective side views from the top and bottom respectively of a first embodiment of mounting device in an open state.

DETAILED DESCRIPTION

Figure 1:
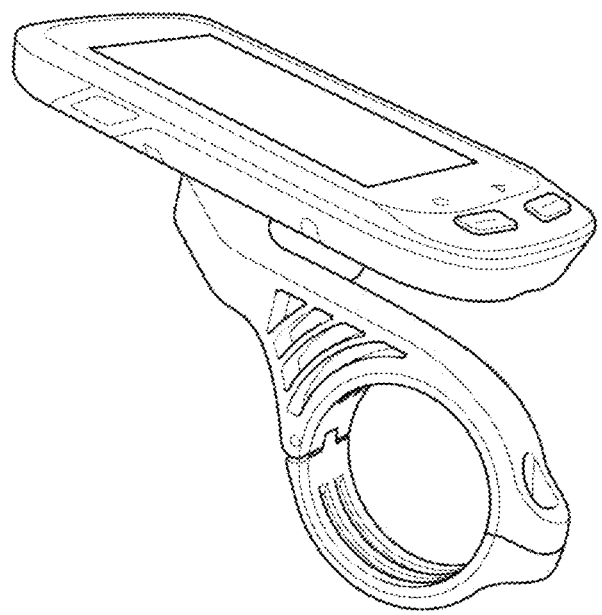
FIG. 1 shows a known, prior art type of handlebar mount, formed as a single rigid unit with a handlebar connector for connecting the mount to a set of handlebars at one end by passing around and gripping the handlebar, and a device mount at the other end for connecting an accessory to the mount, an elongate body connecting between the two end parts.
Figure 2A:
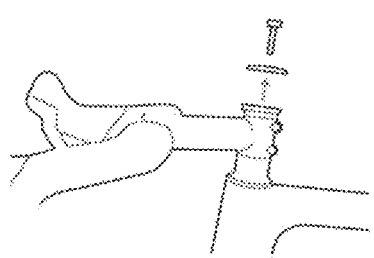
FIG. 2A shows a perspective view of a known, prior art type of accessory mounting device that connects directly to the headset/stem of the handlebars via a bolt or similar that screws into the fork steerer tube, with the accessory mounting portion extending from the top of the stem so that an accessory can be mounted on top of the stem.
Figure 2B:
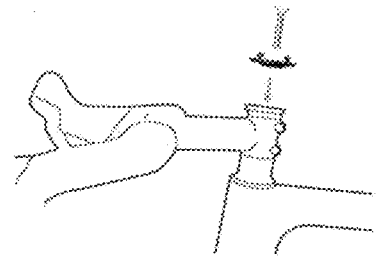
FIG. 2B shows a perspective view of a known, prior art type of accessory mounting device that connects directly to the headset/stem of the handlebars via a bolt or similar that screws into the fork steerer tube, with the accessory mounting portion extending from the top of the stem so that an accessory can be mounted on top of the stem.
Figure 2C:
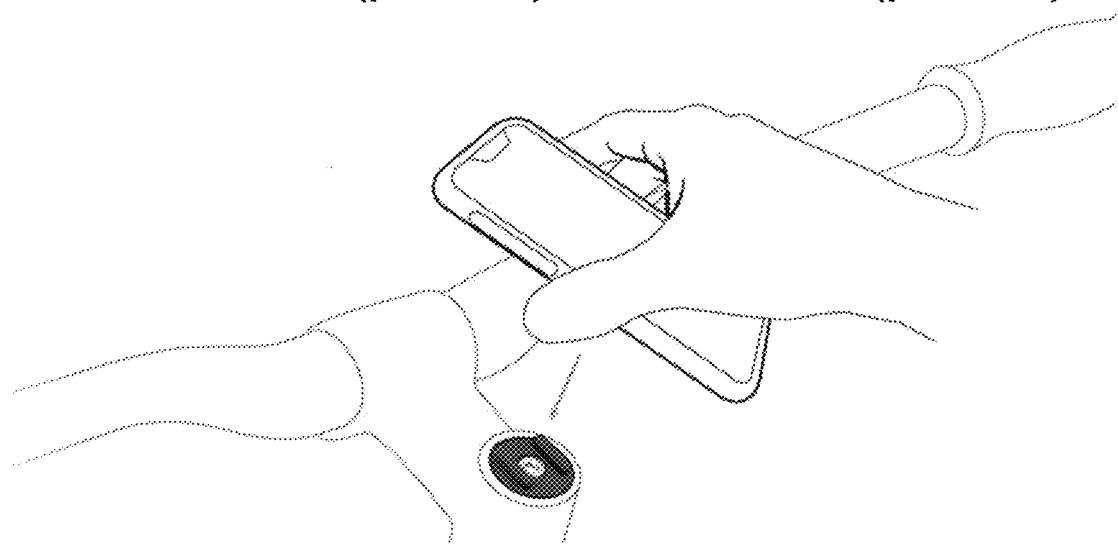
FIG. 2C shows a perspective view of a known, prior art type of accessory mounting device that connects directly to the headset/stem of the handlebars via a bolt or similar that screws into the fork steerer tube, with the accessory mounting portion extending from the top of the stem, and the accessory being shown prior to mounting on top of the stem.
Figure 2D:
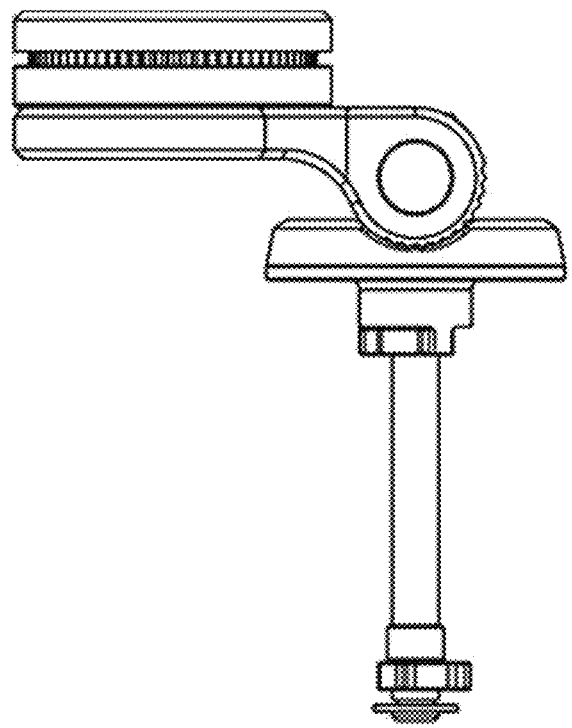
FIG. 2D shows a side view of a similar prior art type of stem mounted accessory mounting device s that shown in FIGS. 2A-2C.
Figure 3:
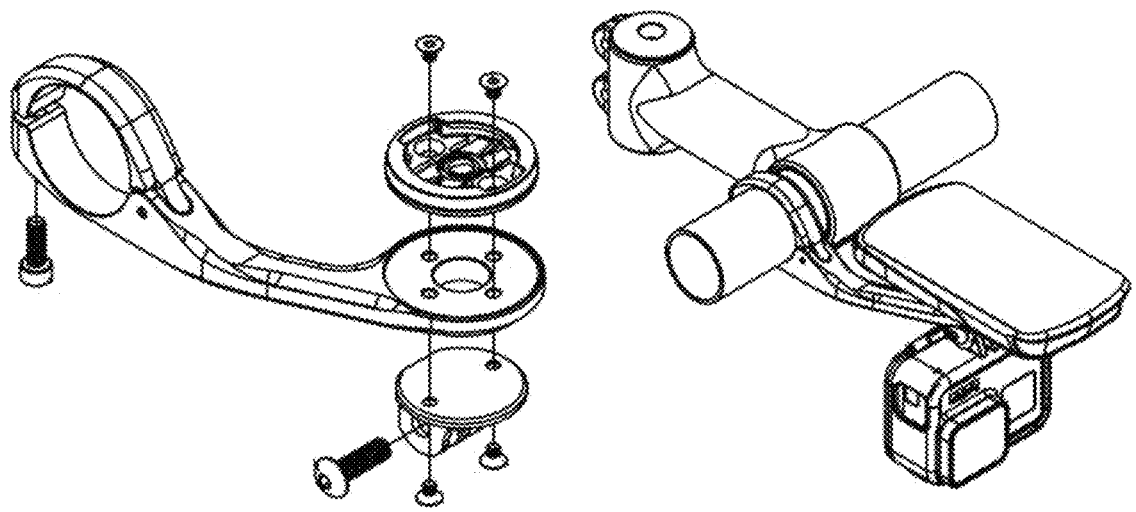
FIG. 3 shows a perspective view of known, prior art type of accessory mounting device similar to that shown in FIG. 1 that uses a quarter-turn connector to mount the accessory to the mounting device.

Embodiments of the invention, and variations thereof, will now be described in detail with reference to the figures.

General

In all embodiments, the mounting device fits directly onto the vehicle headset/stem by fixing to the fork steerer tube, in the location where the 'stem cap' or 'stem nut' is normally attached. The mounting device is therefore strongly integrated with the vehicle. The mounting device provides a 'universal' connector, allowing a wide variety of different accessories to be connected to the bike, without requiring the use of a unique or particular type of connector. When not in use, the accessory mounting device closes up into a compact shape.

In this document, 'fork steerer tube' is used to refer to the equivalent location in bicycle, scooter, motorcycles, e-bikes, and all similar vehicles.

First Embodiment

A first embodiment of the mounting device 1 is shown in FIGS. 4A to 9E.

The mounting device 1 comprises three main parts: a main body portion 2, a pair of mounting grips 3a, 3b, and a headset bolt 4. The structure of these, and the elements that connect between them, are described in detail below.

The mounting device 1 is shown in a 'closed' position in FIGS. 4A and 4B. Similar views of the mounting device 1 in an 'open' position are shown in FIGS. 5A and 5B.

In the 'closed' state, the main body portion 2 is substantially circular when viewed in plan view, and approximately the same size as the outer diameter of the fork steerer tube of a bicycle (fork steerer tubes usually come in substantially standard sizes of 1 inch, 1⅛ inch, 1.25 inch and 1.5 inch sizes).

The headset bolt 4 in use screws into the top of a bicycle stem, so that the main body portion 2 locates flush with the top of the stem. That is, the headset bolt 4 extends 'downwards' from the main body 2.

Figure 6A:
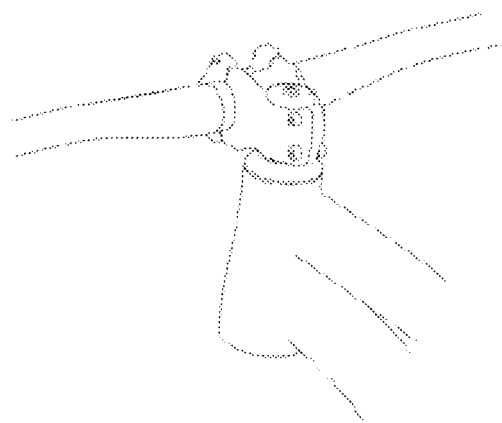
FIGS. 6A and 6D are perspective views showing the required steps for mounting the embodiment of mounting device of FIGS. 4A and 4B and FIGS. 5A and 5B to a headset/stem and fixing into the fork steerer tube.
Figure 6B:
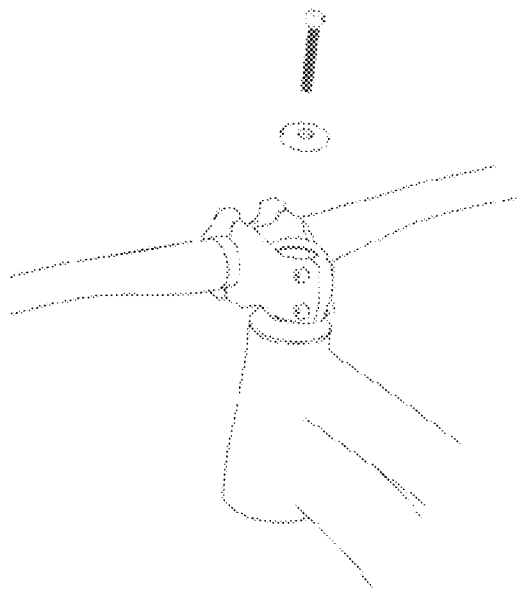
Figure 6C:
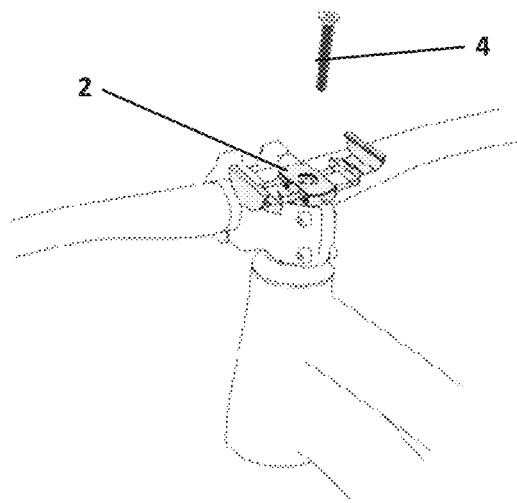

The process by which the mounting device 1 is mounted to the fork steerer tube of a bicycle is shown FIGS. 6A and 6B. First, the existing bolt and stem cap are removed as shown in FIGS. 6A and 6B. Then the mounting device 1, in an open configuration, is positioned over the top of the stem, as shown in FIG. 6C. The headset bolt 4 is then passed downward through the main body 2 and screwed into the fork steerer tube to connect the mounting device 1 to the headset/stem (the structure of the main body 2 that enables this is described in detail below).

Figure 6D:
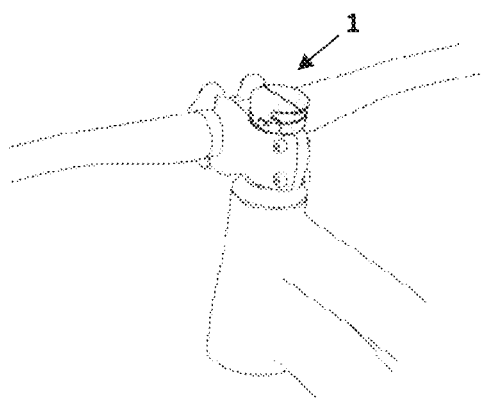
Figure 7:
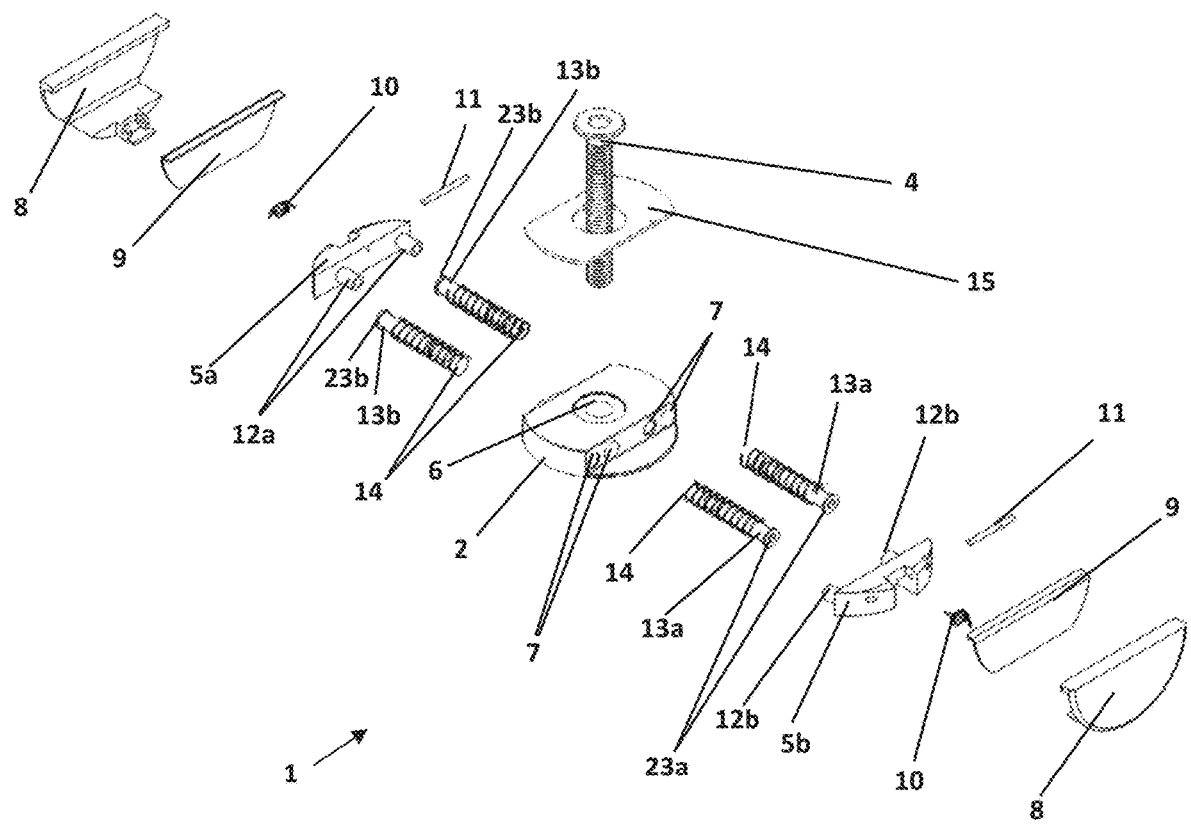
FIG. 7 shows a perspective exploded view of the mounting device of FIGS. 4A to 6D.
Figure 8:
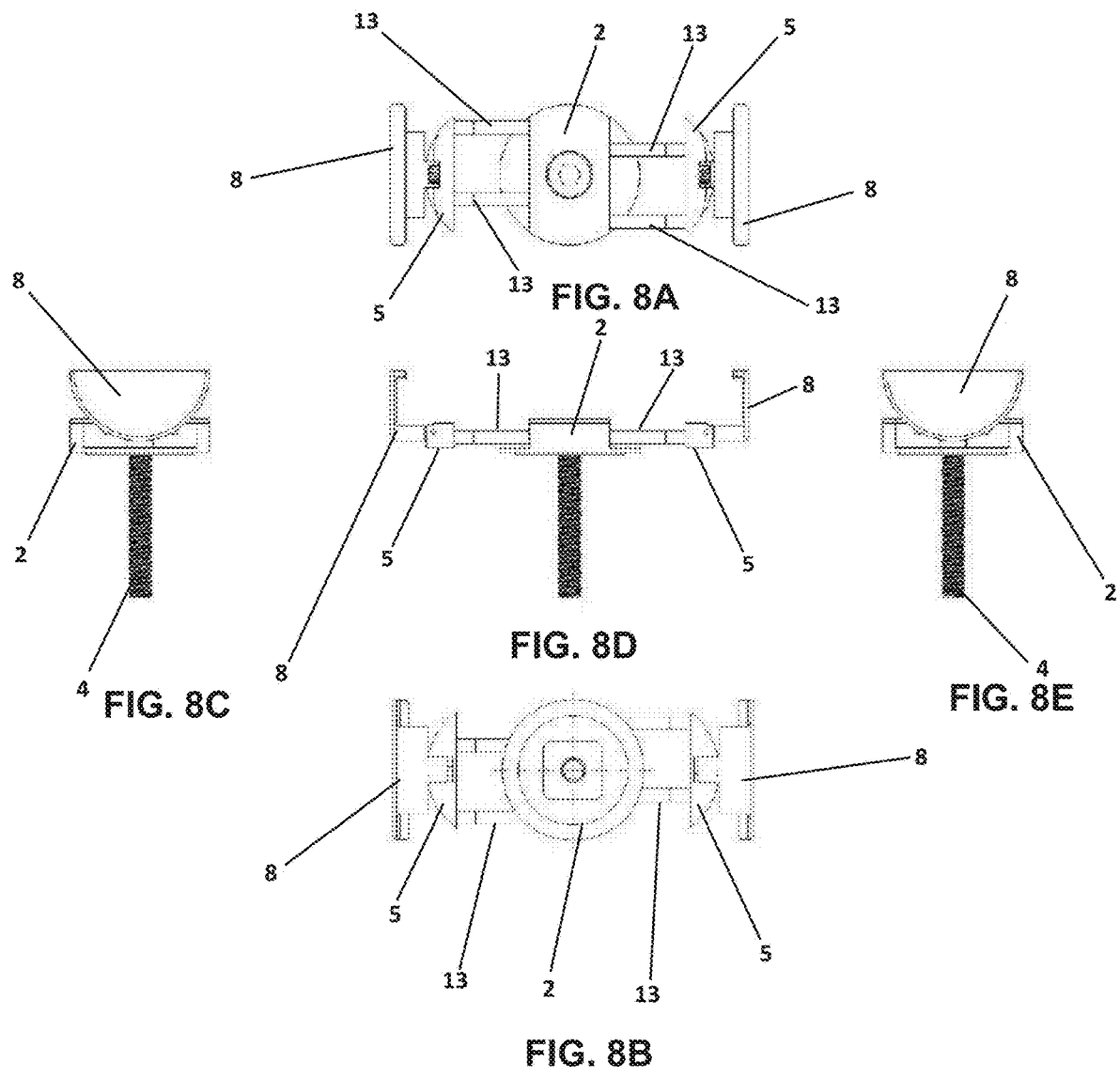
FIGS. 8A to 8E show top, bottom, and side projection views of the mounting device of FIGS. 4A to 7 in an open position.
Figure 9:
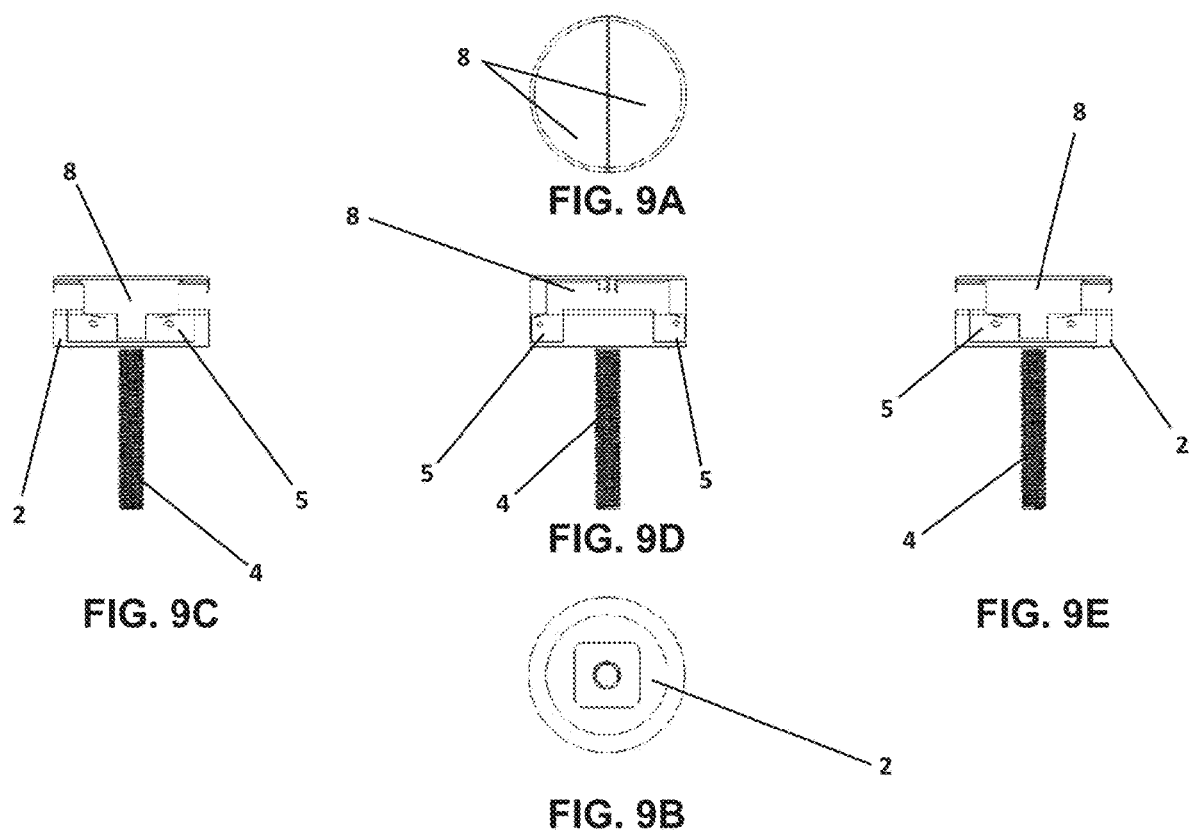
FIGS. 9A to 9E show top, bottom, and side projection views of the mounting device of FIGS. 4A to 7 in a closed position.

When not in use, the mounting device 1 is retained in a 'closed' configuration as shown in FIG. 6D. To mount an accessory, the device 1 is opened to grip the accessory as described below.

The structure of the device and it's parts will now be described in more detail.

Main Body Portion

The main body portion 2 in plan view appears generally circular, with a central bolt hole 6 that extends through the centre of the main body portion 2.

The main body portion 2 has cut-out portions at each side, the cut-out portions shaped as disk segments, each disk segment the same size as the other, and arranged so that the secant/chord for each segment is parallel to the secant/chord of the other (i.e. the main body 2 is symmetrical about a central axis of symmetry that is parallel to the secants/chords). The cut-off disk segments at each side extend most, but not the entire, way down each side of the main body portion 2, so that the base 2a of the main body portion 2 forms a full circle. The upper face and lower face of the main body 2 are generally planar, and parallel to one another.

Four passageways 7 are formed through the main body portion, substantially halfway between the upper and lower faces, and in parallel to the upper and lower faces. The passageways 7 are aligned substantially perpendicular to the secants/chords, and extend all the way through the main body 2 from one cut-out portion to the other. The passageways are substantially evenly spaced across the main body 2.

Mounting Grips

The mounting grips 3a, 3b each consist of a carriage 5, a flap 8, a grip pad 9, and a torsion spring 10 and hinge pin 11.

The carriages 5 locate at each side of the main body portion 2, and are generally the same shape and size as the cut-out disk segment areas, and fit into these. Each carriage 5 has a pair of extensions 12, each extension 12 sized and shaped to fit into one of the passages 7. The extensions 12 are positioned on the carriages 5 so that they will fit into the first and third passages 7 on one side of the main body 2, and the second and fourth passages 7 on the other. Each extension 12 has an end aperture, and is internally threaded.

Each carriage 5 is configured to receive the hinge pin 11 and torsion spring 10 so that the hinge spring 10 acts as an axis of rotation for the flap 8, allowing it to rotate around the hinge pin 11. The hinge pin 11 and carriage 5 are configured so that this axis of rotation is substantially parallel to the secants/chords. The torsion spring is configured to connect with the carriage 5 and hinge pin 11 so that the flap 8 will remain rotated downwards/inwards onto the top face of the main body 2 (the closed position), unless rotated outwards/upright substantially 90 degrees, to the open position, the flap 8 then retained in the open position unless rotated closed.

The grip pad 9 is formed of silicone elastomer or similar, and is attached to the inner surface of the flap 8, and provides a high-friction grip surface.

Extension Sliders

Connection between the main body portion 2 and the mounting grips is achieved via extension slider shafts 13 and springs 14.

The four extension slider shafts 13 extend through the four passages 7. Each extension slider shaft has a flange 23 at one end, with the opposed end the same diameter as the remainder of the body of the shaft, and externally threaded to match the internal threading of the extensions 12. The non-flanged/threaded ends of the shafts are inserted into the passages 7 first, two shafts 13 into the passages on one side of the main body section 2, and the other two shafts on the other side, so that there are two threaded ends extending from each side. Each threaded end of each of the shafts 13 abuts an extension 12, and the shafts 13 and extensions 12 are connected by screwing together. Shafts 13a are connected to extensions 12a, and shafts 13b are connected to extensions 12b.

Coil springs 14 are configured so that in use they wind loosely around and extend the length of each of the slider shafts 13, and sit loosely around the slider shafts and in the passages 7 between the passage wall and the outer surface of the slider shaft in use. One end of each of the passages has a smaller/narrower end aperture than the other, the shaft 13 passing snugly through the smaller/narrower end aperture, but the coil of the spring having a larger diameter, and unable to pass through, so that the springs can only be inserted into a passage on one side.

When the mounting grip on one side is pulled away from the main body section 2, the connection between the relevant two extensions and the connected two shafts means that the shafts are pulled through their passages—e.g. when carriage 5a is pulled away from the main body, this pulls shafts 13a through the passages 7. The flanges 23a act so that those springs 14 around the shafts 13a will be compressed as the shaft 13 is pulled through the passage 7—the flange 23a moves through the passage, and the spring is compressed between the flange 23a and the narrower/smaller end aperture at the other end of the passage. Similarly, the threaded ends of shafts 13b connect to extensions 12b for similar operation on the opposite side.

The springs 14 compress from a neutral state when the carriages 5 are pulled outwards away from the main body 2, and (re)act from this compressed position to exert a force to return to their neutral position (that is, with the carriage 5 located in the cut-out section).

It can be seen that the pair of carriages 5 will therefore exert a compressive gripping force on any item located between the carriages when they are extended away from the body 2.

Use

In use, a user will mount the mounting device 1 onto the bicycle headset/stem by fixing into the fork steerer tube, in the location where the 'stem cap' is normally attached by a headset bolt, as described above, and in the manner as shown in FIGS. 6A through 6D.

When they wish to mount an accessory on the bicycle, they will pivot the spring-loaded flaps upwards and outwards from the 'closed' position (shown in FIG. 6D and as described above), to the 'open' position (shown in FIGS. 5 and 5B, and as described above), and slide the flaps away from one another and from the main body portion 2.

They will locate their accessory (mobile phone, GPS, bike computer) between the flaps, and then release them so that the springs 14 pull the flaps 8 inwards, to grip the sides of the accessory, and hold it in position.

Grip is also increased by the silicone pads 9 which make contact with the phone bezel, a further silicone pad 15 can be added on the upper surface of the main body 2 to contact the rear of the accessory and assist with holding this in position.

The elements described above are sized and shaped so as to accommodate an accessory (e.g. a phone) of most common sizes.

The travel distance (the distance that the slider shafts 13 and mounting grips 3a, 3b move, sliding inwards and outwards) allows the distance between the inner faces of the two flaps to be altered, so that these can in use grip the sides of a mobile device or similar accessory.

The distance can be altered, with the mounting grips 3a, 3b remaining in the position to which they are moved, and this allows the mounting device 1 to be used with accessories/devices of different sizes or widths.

When not in use, the flaps 8 are folded into the closed position, with the flaps 8 inwards towards the main body 2, and the shafts 13 fully retracted inwards, so that the upper surface of the device 1 appears as a smooth disc.

Second Embodiment

The first embodiment of mounting device 1 described above is particularly suited for use with push bikes.

Figure 10:
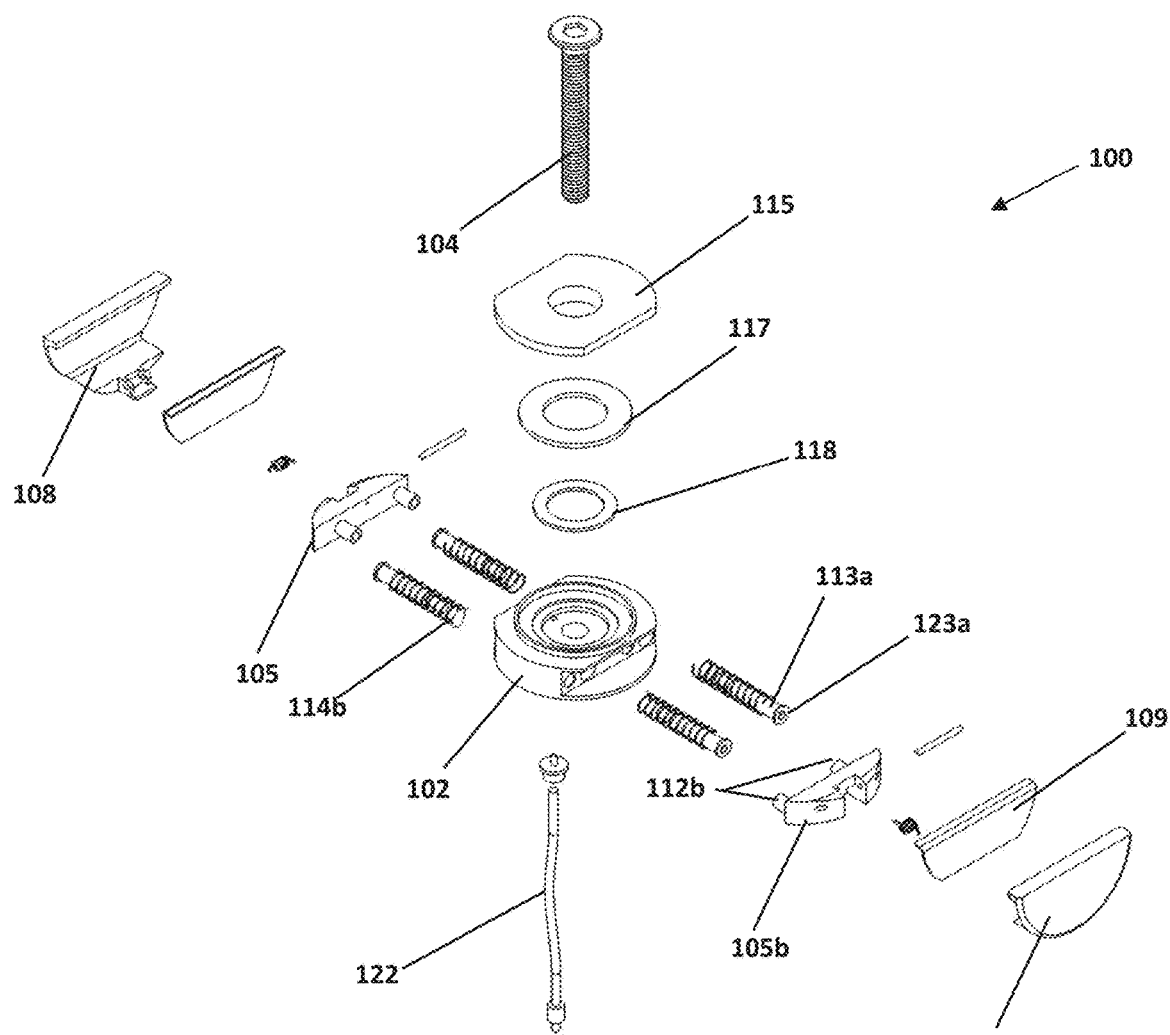
FIG. 10 shows a perspective exploded view of a second embodiment of the mounting device.

A second embodiment of mounting device 100, adapted specifically for use with electric bicycles, is described below, with reference to FIG. 10. Similar figure numbering is used for this embodiment, with similar items numbered in a similar fashion to that of the first embodiment—e.g. mounting devices 1 and 100, main body portions 2 and 102, bolts 4 and 104, carriages 5 and 105, etc.

The structure and operation of the mounting device 100 is substantially the same as for the first embodiment (mounting device 1). However, in this embodiment, the body 102 comprises a power/data lead and adaptor passage (not shown) to one side of the central bolt aperture 106, towards one of the mounting grip assemblies 103a. The passage 116 allows a cable connected to power adaptor 118 to pass through from the top surface of the body 102 to the lower surface, and to extend roughly parallel to the bolt 104. In this embodiment, a wireless charging coil 117 and PCB 118 are located on the upper surface of the main body 102, between the main body 102 and the silicone pad 115.

The cable 122 allows power and data to be provided to the wireless charging coil 117 and PCB 118 so that accessories using the mounting device 100 can be charged and communicated with.

Variation

Figure 11A:
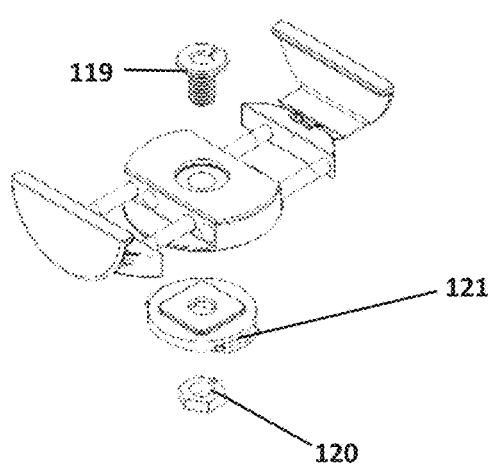
FIGS. 11A and 11B show top and bottom perspective and partly exploded views of the second embodiment of the mounting device in an open position.
Figure 11B:
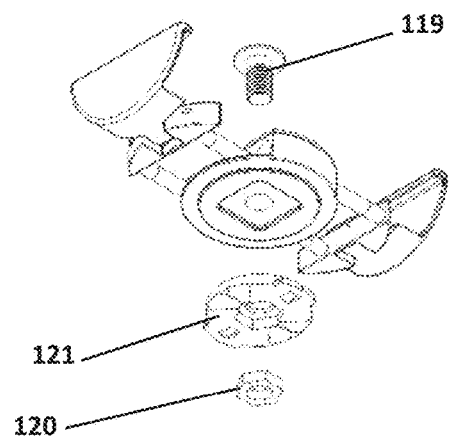

In a variation of both of the above embodiments, as shown in FIGS. 11A and 11B, the mounting devices 1, 100 are modified so that the lower side of the main body (2, 102) comprises a quarter-turn or 'bayonet' connector 121.

As shown in FIGS. 11A and 11B, in order to fit the quarter-turn or 'bayonet' connector 121, the bolt 1, 104 is replaced by a shorter bolt 119 and a nut 120. In variations, the nut could instead be a threaded insert.

The quarter-turn or 'bayonet' connector adapter 121 of the main body 2,102 is configured so that it is in plan view the same size and shape as the lower surface/base of the upper part of the main body 2, 102. The lower side of the quarter-turn or 'bayonet' connector 121 is configured so that the nut 120 can fit into a nut-shaped recess on the lower side.

In use, the quarter-turn or 'bayonet' connector 121 is connected into place on the bottom face of the main body 2, 102 by the bolt 119 passing through the main body from the top, and the nut 120 slotting into the nut-shaped recess and connecting with the bolt 119.

The mounting devices 1, 100, fitted with the quarter-turn or 'bayonet' connector 121, can now be used with the second part of a standard quarter turn connector, fitted to a set of bicycle handlebars, or similar.

The quarter-turn or 'bayonet' connector could also be integrally formed as an integral part of the main body 2 or 102.

The quarter-turn or 'bayonet' connector could also replace or interface with the 'stem nut' or 'steering nut' of a motorcycle or scooter, or similar vehicle.

The invention claimed is:

1. A mounting device, comprising:
    a main body portion;
    a pair of mounting grips configured to movably connect to the main body from a first position substantially against the body, and a second position away from the main body, the grips in the second position configured to grip and hold a secondary accessory in position on the mounting device;
    each of the mounting grips comprising a carriage and a flap, the carriages and main body portion configured so that the flaps can rotate from the first position where the flaps are arranged to cover the top surface of the main body, substantially through 90 degrees to an open position where the flaps are rotated upright;
    the mounting grips further comprising a spring adapted to hold the flap in the first position and the open position;
    the main body portion configured to connect to a vehicle fork steerer tube.

2. A mounting device as claimed in claim 1 wherein the main body portion is substantially circular in plan view and substantially the same outer size and shape as the outer diameter of a fork steerer tube.

3. A mounting device as claimed in claim 1 further comprising a grip pad on the inner surface of each mounting grip, configured to provide a high-friction gripping surface.

4. A mounting device as claimed in claim 1 wherein the main body portion comprises substantially identical cut-out portions at each side, extending partway down each side of the main body portion, the carriage of the mounting grip fitting substantially within the cut-out portion.

5. A mounting device as claimed in claim 4 wherein the cut-out portions are disk-segment shaped.

6. A mounting device as claimed in claim 1 wherein the main body portion is configured to receive a headset bolt, so that the headset bolt can connect to the top of a vehicle fork steerer tube to hold the main body portion in position.

7. A mounting device as claimed in claim 6 wherein the main body portion is configured to receive the headset bolt through an aperture extending through the main body portion.

8. A mounting device, comprising:
   a main body portion;
   a pair of mounting grips configured to movably connect to the main body from a first position substantially against the body, and a second position away from the main body, the grips in the second position configured to grip and hold a secondary accessory in position on the mounting device;
   the main body comprising a plurality of substantially parallel passageways formed through the main body portion between the cut-out portions, and a plurality of extension slider shafts configured to locate into and slide within the passages in use, the outer ends of the extension slider shafts connecting to the mounting grips;
   the main body portion configured to connect to a vehicle fork steerer tube.

9. A mounting device as claimed in claim 8 further comprising springs configured to connect between the extension slider shafts and the mounting grips to pull the mounting grips towards the main body, so that a compressive gripping force is exerted on any object located between the mounting grips.

10. A mounting device as claimed in claim 9 wherein the springs and extension slider shafts are associated with the mounting grips and are configured so that the springs associated with a mounting grip compress from a neutral position when the associated mounting grip is moved away from the main body portion.

11. A mounting device, comprising:
    a main body portion;
    a pair of mounting grips configured to movably connect to the main body from a first position substantially against the body, and a second position away from the main body, the grips in the second position configured to grip and hold a secondary accessory in position on the mounting device;
    the main body portion comprises one part of a bayonet or quarter-turn type connector on the lower side thereof;
    the main body portion configured to connect to a vehicle fork steerer tube.

12. A mounting device as claimed in claim 11 wherein the bayonet or quarter-turn type connector part is bolted to the remainder of the main body.

13. A mounting device as claimed in claim 11 wherein the bayonet or quarter-turn type connector part is an integral part of the main body.

* * * * *